R. MONTFORT.
Grain-Drill.
No. 197,880. Patented Dec. 4, 1877.
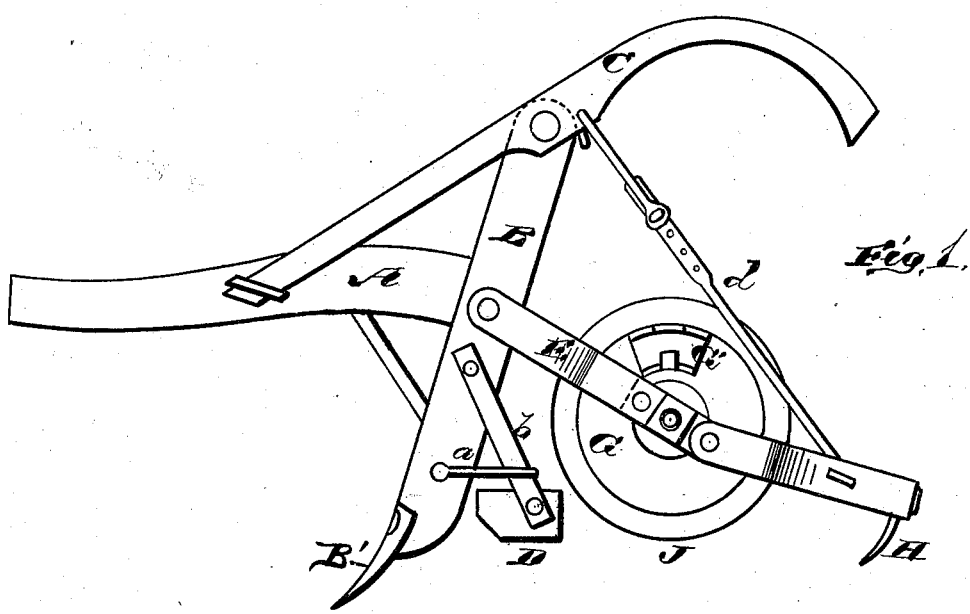
Fig. 1.
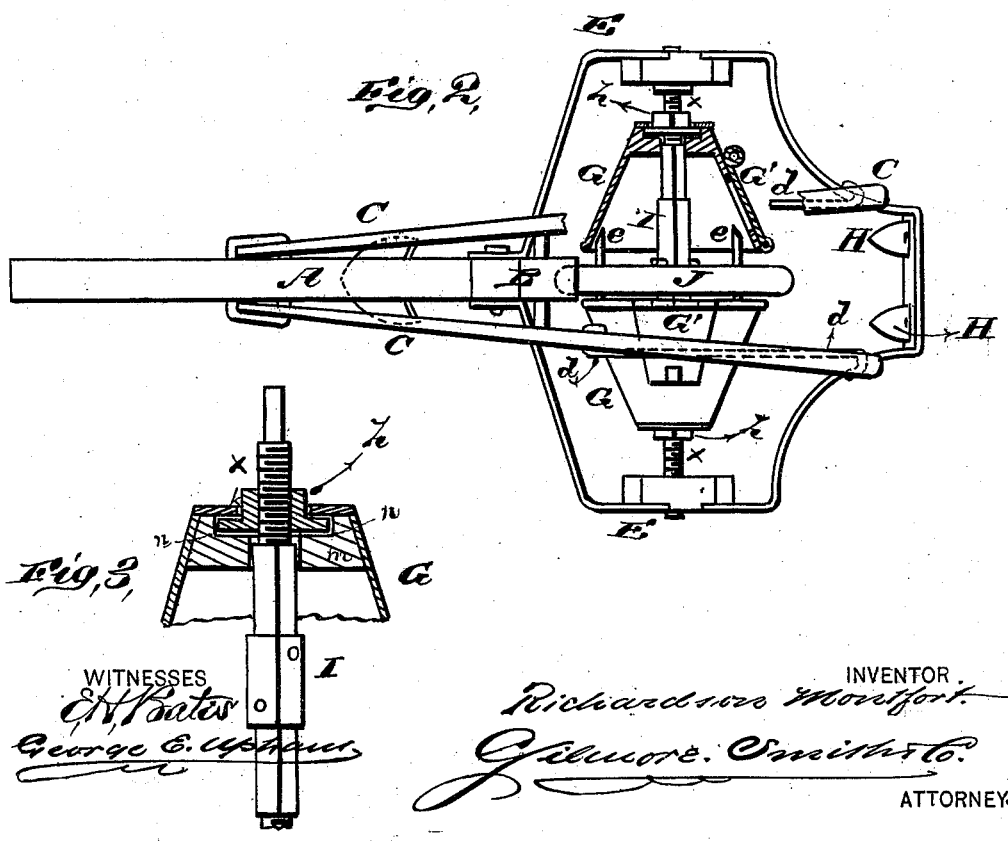
Fig. 2.
Fig. 3.
WITNESSES
E. H. Bates
George E. Upham
INVENTOR
Richardson Montfort
Gilmore, Smith & Co.
ATTORNEYS.

UNITED STATES PATENT OFFICE.

RICHARDSON MONTFORT, OF BUTLER, GEORGIA.

IMPROVEMENT IN GRAIN-DRILLS.

Specification forming part of Letters Patent No. 197,880, dated December 4, 1877; application filed August 18, 1877.

*To all whom it may concern:*

Be it known that I, RICHARDSON MONT-FORT, of Butler, in the county of Taylor and State of Georgia, have invented a new and valuable Improvement in Grain-Drills; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my grain-drill. Fig. 2 is a sectional plan view; and Fig. 3 is a sectional detail thereof.

The nature of my invention consists in the construction and arrangement of a grain-drill and fertilizer-distributer, as will be hereinafter more fully set forth.

The annexed drawings, to which reference is made, fully illustrate my invention.

A represents a plow-beam, B the plow standard or foot, with a shovel-plow, B′, and C C the handles, all constructed in any of the known and usual ways.

Behind the lower end of the plow-foot B is a block, D, connected to it by arms $a\ a$ and braces $b\ b$, which block presses the furrow so as to allow the seed to fall into the bottom thereof.

To the plow-foot B is attached a frame, E, which is connected by rods $d\ d$ with the handles C C. These rods, in a full-sized machine, will be made adjustable, so as to gage the depth at which the covering-plows H H are to work, said plows being secured to the rear part of the frame E.

In the sides of this frame an axle, I, has its bearings. This axle is made square, but near each end it is provided with exterior screw-threads $x$. In the center of the axle I is secured a solid wheel, J, which runs in the furrow, and thus turns the axle in its bearings. On each side of this wheel is a conical hopper, G, provided with a door, G′, the larger end of said hopper being nearest to the wheel, and held concentric therewith by means of pins $e\ e$ projecting from the wheel, and around which the hopper is fitted. In the smaller end or head of each hopper is swiveled a nut, $h$, which screws on the thread $x$ of the axle, and by means of which the hopper may be moved out or in so as to regulate the space left between the center wheel and the inner end of the hopper, and thus regulate the amount of seed or fertilizer sown. $m$ is a conical block situated at the end of each hopper, which the latter encircles. Each conical block $m$ is provided with a recess, $n$, for the reception of a flange on the lower end of the nut $h$.

One of the hoppers is intended for seed and the other for fertilizer.

This machine is simple in construction, and distributes the seed with regularity and uniformity.

What I claim as new, and desire to secure by Letters Patent, is—

1. The combination, with the square axle I, screw-threaded at its ends, and provided with the flanged nuts $h\ h$, of the hoppers G and blocks $m$, having recesses $n$, substantially as described, and for the purpose set forth.

2. A grain-drill and fertilizer-distributer, consisting of the square axle I, screw-threaded at its ends, nuts $h\ h$, having flanges fitting in the recesses $n\ n$ of the conical blocks $m$, adjustable hoppers G G, wheel J, shovel B′, block D, rigidly attached to the plow-standard, and adjustable frame E, provided with covering-plows H, the whole constructed, arranged, and operated in the manner and for the purpose set forth.

In testimony that I claim the above I have hereunto subscribed my name in the presence of two witnesses.

RICHARDSON MONTFORT.

Witnesses:
W. H. REED,
A. B. REED.